United States Patent [19]

Lunsford

[11] 4,327,457
[45] May 4, 1982

[54] WINDSHIELD WIPER AND METHOD OF MAKING SAME

[75] Inventor: Bobby R. Lunsford, Centerville, Ohio

[73] Assignee: Dayco Corporation, Dayton, Ohio

[21] Appl. No.: 179,857

[22] Filed: Aug. 20, 1980

[51] Int. Cl.³ ............................................. B60S 1/38
[52] U.S. Cl. ............................. 15/250.03; 15/250.41
[58] Field of Search ............ 15/250.4, 250.41, 250.03, 15/250.36

[56] References Cited

U.S. PATENT DOCUMENTS

| | | | |
|---|---|---|---|
| 1,692,036 | 11/1928 | Hachenberg | 15/250.4 X |
| 2,027,971 | 1/1936 | Godown | 15/250.03 |
| 2,203,071 | 6/1940 | Zaiger | 15/250.03 |

FOREIGN PATENT DOCUMENTS 2707703  8/1978  Fed. Rep. of Germany ... 15/250.41
1316781  5/1973  United Kingdom ............. 15/250.41

*Primary Examiner*—Peter Feldman
*Attorney, Agent, or Firm*—Joseph V. Tassone

[57] ABSTRACT

A device for cleaning a window surface and method of making same are provided wherein the device comprises a pair of wiping members disposed in spaced apart relation parallel to a longitudinal axis thereof and a cleaning member disposed between the wiping members; and, the cleaning member comprises a substantially semicylindrical portion which is adapted to engage the window surface roughly midway between the wiping members during cleaning movements of the device in either of opposed directions roughly perpendicular to its longitudinal axis with the semicylindrical portion being made of a yieldable resilient material and providing a substantially rectangular cleaning surface upon being compressed against the window surface.

16 Claims, 8 Drawing Figures

U.S. Patent  May 4, 1982  4,327,457
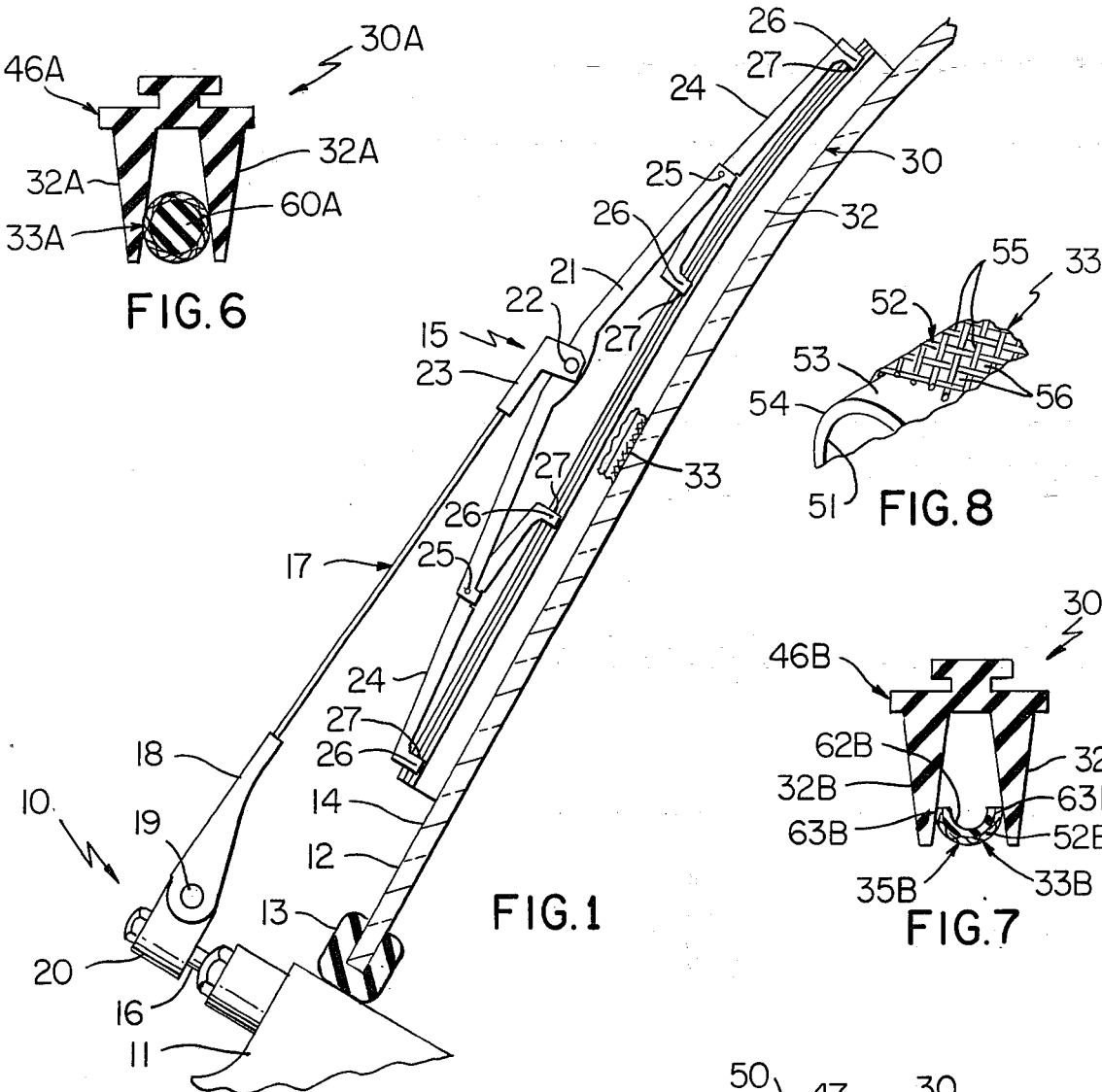

WINDSHIELD WIPER AND METHOD OF MAKING SAME

BACKGROUND OF THE INVENTION

1. Field of the Invention

This invention relates to a windshield wiper device and method of making same.

2. Prior Art Statement

It is known in the art to provide a windshield wiper for vehicles, such as automobiles, wherein such a wiper comprises a pair of wiping members disposed in spaced apart relation parallel to a longitudinal axis of the windshield wiper with an additional structure being disposed between such wiping members. Usually such additional structure has been provided previously for the purpose of improving the wiping action of the parallel wiping members. For example see the following United States patents:

(1) U.S. Pat. No. 1,753,651
(2) U.S. Pat. No. 1,816,370
(3) U.S. Pat. No. 2,289,545

Accordingly, it appears that in item (1) the windshield wiper utilizes one or more central components for the purpose of stiffening a pair of outer comparatively long wiping elements. Similarly, it appears that in item (2) an inner so-called tubular portion is provided for the purpose of adding pressure to a lead wiping element in the direction of movement. It also appears that in item (3) a core member is provided to support an outer wiping member in the direction of movement.

U.S. Pat. No. 3,631,561 teaches a so-called snap-on cleaning unit for use with a standard single-blade windshield wiper and wherein such unit has ice scrapers defining its opposite edges and such unit is attached in position so that the standard wiper is disposed centrally therein. In addition, the unit may be provided with at least a pair of cleaning members adjacent its opposite edges.

U.S. Pat. No. 3,638,274 teaches a window wiper having a pair of wiping members and a central cleaning member and the central cleaning member has a hard plastic inverted V-shaped edge which engages a surface to be cleaned and is provided for the purpose of scraping ice, or the like.

However, the need exists in the art for an efficient and comparatively inexpensive device for cleaning a window surface of dirt, muddy tire splash, bugs, insects, and the like smeared against such window surface.

SUMMARY

It is a feature of this invention to provide an improved and inexpensive device for cleaning a window surface wherein such device is particularly adapted to clean the window surface of foreign materials, such as, dirt, muddy tire splash, bugs, and insects smeared against the window surface.

Another feature of this invention is to provide a device of the character mentioned which is also effective in cleaning light frost from a window surface.

Another feature of this invention is to provide a device of the character mentioned comprised of a pair of wiping members disposed in spaced apart relation and parallel to a longitudinal axis of the device and a yieldable cleaning member disposed centrally between the wiping members and wherein such cleaning member provides an efficient cleaning function while the wiping members provide a wiping function on opposite sides of such cleaning member.

Another feature of this invention is to provide a device of the character mentioned in which the cleaning member comprises a substantially semicylindrical portion which is adapted to engage the window surface roughly midway between the wiping members during cleaning movements of the device in either of opposed directions roughly perpendicular to its longitudinal axis with the semicylindrical portion being made of a yieldable resilient material and providing a substantially rectangular cleaning surface upon being compressed against the window surface.

Another feature of this invention is to provide a device of the character mentioned in which the rectangular cleaning surface of the cleaning member has an area which is increased as a function of the pressure with which the cleaning member is urged against the window surface being cleaned.

Another feature of this invention is to provide a device of the character mentioned in which each of the wiping members and the cleaning member of the device is made primarily of polymeric material.

Another feature of this invention is to provide a device of the character mentioned in which each of the wiping members and the cleaning member of the device is made primarily of rubber.

Another feature of this invention is to provide a device of the character mentioned in which the semicylindrical portion has a fabric-like material comprising the exposed surface thereof and wherein such fabric-like material provides an improved cleaning action.

Another feature of this invention is to provide a device of the character mentioned in which the semicylindrical portion defines the entire cleaning member.

Another feature of this invention is to provide a device of the character mentioned in which the semicylindrical portion defines an outwardly facing portion of a right circular cylindrical member.

Another feature of this invention is to provide a device of the character mentioned in which the right circular cylindrical member is made of a solid yet compressible polymeric material.

Another feature of this invention is to provide a device of the character mentioned in which the right circular cylindrical member is made of a tubular compressible polymeric material.

Another feature of this invention is to provide a device of the character mentioned in which the wiping members are defined as a single-piece structure having a roughly U-shaped cross-sectional configuration and the cleaning member is bonded between the wiping members thereby defining the device as a unitary structure.

Another feature of this invention is to provide a device of the character mentioned in which the wiping members have an identical cross-sectional configuration which is in the form of an isoscoles trapezoid with the narrower one of the parallel sides being adapted to engage a window surface to be cleaned.

Another feature of this invention is to provide an improved method of making a cleaning device of the character mentioned.

Therefore, it is an object of this invention to provide an improved window cleaning device and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a view with parts in cross section, parts in elevation, and parts broken away particularly illustrating one exemplary embodiment of a cleaning device of this invention engaging an exposed surface of a window to be cleaned;

FIG. 2 is a side elevation of the device of this invention, with the central portion thereof broken away, and illustrating such device disposed in a straight rectilinear path;

FIG. 3 is a cross-sectional view taken essentially on the line 3—3 of FIG. 2;

FIG. 4 is a view similar to FIG. 3 showing the device of this invention being urged against a window surface being cleaned and particularly illustrating the configurations of the component members of the device during movement in one direction roughly perpendicular to the longitudinal axis of the device;

FIG. 5 is a view similar to FIG. 4 illustrating the component members during movement of the device in a direction diametrically opposite from the direction of FIG. 4;

FIG. 6 is a view similar to FIG. 3 illustrating another exemplary embodiment of the device of this invention;

FIG. 7 is a view similar to FIG. 3 illustrating another exemplary embodiment of the device of this invention; and FIG. 8 is an enlarged fragmentary perspective view particularly illustrating details of the central cleaning member of the device of FIG. 3.

DETAILED DESCRIPTION

Reference is now made to FIG. 1 of the drawing which illustrates a fragmentary portion of a motor vehicle, in the form of a automobile, which is designated generally by the reference numeral 10. The automobile 10 comprises a body structure 11 which has a front window or windshield 12 suitably supported thereon and such windshield is provided with a peripheral sealing member, or seal 13, as is known in the art. The front windshield 12 is made of the usual transparent safety glass, or the like, and has an outer window surface 14.

The automobile 10 has a wiper assembly 15 for its windshield 12 and the assembly 15 is detachably fastened on an actuating shaft 16 which extends from the forward portion of the body structure. The assembly 15 has an arm 17 which is spring loaded and urged toward the window surface 14, as is known in the art, and the arm has an inner end portion 18 pivotally fastened by a pivot pin 19 to a support 20 which is detachably fastened to the actuating shaft 16. The assembly 15 has a main pressure distributing member 21 pivotally fastened by a pivot pin 22 to the outer portion 23 of the arm 17.

The assembly 15 also has a pair of pressure distributing members or yokes each designated by the same reference numeral 24, and each yoke has its central portion pivotally fastened to an associated end portion of the member 21 employing a pivot pin 25. Each member 24 has a pair of holding flanges 26 at its opposite ends and the flanges have special T-shaped slots 27 therein which are particularly adapted to receive and support a cleaning device made in accordance with the teachings of this invention and such cleaning device is designated generally by the reference numeral 30.

The device 30 is an elongate device which has a longitudinal axis 31 (FIG. 3) and such device has a pair of wiping members, each designated by the same reference numeral 32, disposed in spaced apart relation parallel to the axis 31. The wiping members 32 are symmetrically disposed on opposite sides of a central plane which bisects the device 30 and has the axis 31 lying in such plane.

The device 30 also has a cleaning member which is designated generally by the reference numeral 33 and such cleaning member is disposed between the wiping members and is fixed to outer end portions 34 of the wiping members 32 between surfaces of the members 32 which face each other. The cleaning member 33 comprises a substantially semicylindrical portion which is designated generally by the reference numeral 35 and the portion 35 is adapted to engage the window surface 14 roughly midway between the wiping members 32 during cleaning movements of the device 30 in either of opposed directions roughly perpendicular to the longitudinal axis 31.

The semicylindrical portion 35 is made of a yieldable resilient material and provides a flattened or substantially rectangular cleaning surface 36, as shown at 37 in FIG. 4, upon being compressed against the window surface 14 with the compressing action being provided by the pressure distributing member 21 and yoke members 24 under the influence of the spring urged arm 17. The arm 17 is urged by integral mechanical spring devices (not shown) acting between the support 20 and arm 17, as is known in the art. Accordingly, it will be appreciated that the rectangular cleaning surface 36 increases in cleaning area as a function of the force or pressure with which the entire assembly 15 and hence the device 30 is exerted against the window surface 14. For a particular automobile application the above-mentioned force or pressure is substantially constant and determined by the integral spring devices in its assembly 15.

During the cleaning action by the device 30 in one direction, shown by an arrow 40, as viewed in FIG. 4, pointing to the left, the forward or leading wiping member 32 is slightly deflected as shown at 41 and the rear or trailing wiping member is deflected as shown at 42. During this movement the rectangular cleaning surface 36 provides an improved cleaning action in accordance with the teachings of this invention.

During the cleaning action by the device 30 in a direction, shown by an arrow 43 in FIG. 5, which is diametrically opposite from the direction shown by arrow 40 of FIG. 4, the wiping member 32 at the right now becomes the forward or leading member and is deflected as shown at 44 while the member 32 shown at the left becomes the rear or trailing member and is deflected as shown at 45. During this movement, and as described before, the pressure exerted against portion 35 provides the substantially rectangular cleaning surface 36 and an improved cleaning action.

The device 30 is made primarily of polymeric material and preferably the members 32 are defined as integral parts of a single-piece substantially U-shaped structure which is designated generally by the reference numeral 46 in FIG. 3. The U-shaped structure 46 has a bight 47 and parallel legs extending from opposite end portions of the bight 47 with such legs defining the wiping members 32. The single-piece structure 46 also has an integral roughly T-shaped portion 50 extending from the central portion of its bight 47 and in a direction opposite from the direction that the wiping members 32 extend from the bight 47. The T-shaped portion 50 is particularly adapted to be received within the previously mentioned T-shaped slots 27 in the holding flanges 26 of the yokes 24 for the purpose of holding the device 30 in position on the wiper assembly 15.

Each of the wiping members 32 has a substantially trapezoidal cross-sectional configuration (even though it is defined as an integral part of the single-piece structure 46) and the longer of the parallel sides of the trapezoidal cross-sectional configuration defines the base of each member 32. The shorter of the parallel sides of the trapezoidal configuration defines the wiping edge of each member 32. Preferably, and in this example, each member 32 has a cross-sectional configuration in the form of an isoscoles trapezoid.

The cleaning member 33 is a substantially right circular cylindrical member and has the semicylindrical portion 35 defining its outwardly facing portion; and, the cleaning member 33 is a tubular member which has an opening 51 extending centrally therethrough. The cleaning member 33 and hence the semicylindrical portion 35 has a fabric-like material 52 bonded concentrically around and against the outside surface 53 of a tubular inner portion or tubular core 54 of the member 33.

The fabric-like material 52 may be in the form of a woven or braided material, as best shown in FIG. 8, and is disposed around the tubular core 54 so that fabric members 55 of the material 52 define spaced openings 56 therein. Once the material 52 with its spaced openings 56 is moved across the window surface 14 it provides an improved cleaning action due to the raised surfaces defined by members 55.

The material 52 may be disposed against the outside surface 53 and held by friction, adhesive means, or the like. However, the cleaning member 33 may be constructed by providing a tubular core 54 made of uncured rubber material whereupon the fabric-like material 52 may be disposed concentrically therearound. The core member 54 with material 52 therearound may then be cured to provide not only the curing of member 54 but also partial embedment of the members 55 in the polymeric or rubber material defining the tubular core 54. The partial embedment of the fabric-like material 52 in the core 54 serves to reinforce such material and in particular the members 55 comprising the material 52 while assuring that the spaced openings 56 are maintained so that cleaning member 53 will have an extended or prolonged service life.

The cleaning member 33 with its fabric-like material 52 disposed against its core 54 may be fixed in position utilizing any technique known in the art. In some applications of this invention the single-piece unitary structure 46 may be provided as an uncured rubber structure and the member 32 provided using an uncured rubber core 54 with fabric 52 disposed therearound. These components 46, 54, and 52 may then be held together in a suitable fixture and the entire assembly cured to provide a simultaneous curing of components 46 and 54 and bonding of the cleaning member 33 at the desired position along the wiping members 32 which comprise structure 46 with simultaneous bonding of the material 52 against core 54.

It will also be appreciated that the single-piece polymeric structure 46 may be made as a completed structure, i.e., shaped and cured. The cleaning member 33 may be similarly made as a completed structure whereupon the completed member 33 may be adhesively bonded to the opposed inside surfaces 58 of the wiping members 32 by adhesive means 59.

Other exemplary embodiments of the device of this invention are illustrated in FIGS. 6 and 7 of the drawing. The devices illustrated in FIGS. 6 and 7 are very similar to the device 20 whereby such devices will be designated by the reference numerals 30A and 30B respectively and representative parts of each device which are similar to corresponding parts of the device 30 will be designated in the drawing by the same reference numerals as in device 30 (whether or not such representative parts are mentioned in the specification) followed by the letter designation A or B and not described again in detail. Only those component parts of each device which are substantially different from corresponding parts of the device 30 will be designated by a new reference numeral also followed by the associated letter designation, either A or B, and described in detail.

The device 30A of FIG. 6 is similar to the device 30 with the exception that cleaning member 33A thereof has a core portion or core 60A which is of solid cross-sectional configuration instead of being tubular; and, the core 60A is fixed in position between the wiping members 32A. The core 60A is made of a rubber material which is compressible and capable of defining a rectangular cleaning area, similar to the cleaning area 36 previously described, upon being urged by its assembly against the window surface 14.

The device 30B of FIG. 7 is also similar to the device 30 with the exception that its semicylindrical portion 35B defines the entire cleaning member 33B. Accordingly, the cleaning member 33B is comprised of semicylindrical core 62B and a semicylindrical section of fabric-like material 52B fixed against the core 62B. It will be appreciated that in the case of the cleaning member 33B, such member is fixed in position between the wiping members 32B in a similar manner as previously described by fixing the edges 63B against the wiping members 32B.

The single-piece roughly U-shaped components 46, 46A, and 46B of devices 30, 30A, and 30B respectively are shown by cross-hatching as being made of rubber; however, it will be appreciated that such components with their wiping members may be made of any suitable polymeric material. In addition, the core portions 54, 60A, and 62B of the cleaning members 33, 33A, and 33B respectively may also be made of any suitable polymeric material instead of rubber, as shown in each instance.

The fabric-like material 52, 52A, and 52B comprising each of the devices 30, 30A, and 30B respectively may be any suitable material which is capable of being provided as a woven or braided material. However, it is preferred that this material be provided as a seamless material during continuous manufacturing of the associated core member.

Each device 30, 30A, and 30B is shown as having a T-shaped portion (such as portion 50 in device 30) for the purpose of fastening same within an associated assembly, such as the assembly 15; and, in particular, for the purpose of holding same within corresponding T-shaped passages or channels 27 defined in the end portions 26 of the members 24. However, it is to be understood that the concept of this invention is fully applicable with any suitable means being employed to hold and fasten the device of this invention in position on a windshield wiper assembly. Further, it is to be understood that the holding means of the device of this invention may be readily modified to be received within windshield wiper assemblies of standard known construction and so that the device of this invention may be readily interchangeable with replacement windshield wiper blade assemblies currently available on the market.

In this disclosure of the invention the substantially rectangular cleaning surface (such as surface 36) defined by compressing the associated semicylindrical portion (such as portion 35) is of substantial width and area. This has been done to highlight the invention and it is to be understood that the exact size of this area will vary depending on materials used, forces exerted against the cleaning device, and other factors.

The device of this invention has been illustrated and described as being adapted to be used on a vehicle in the form of an automobile; however, it will be appreciated that such device may be used on all types of vehicles, whether in the form of land vehicles, watercraft, or aircraft.

While present exemplary embodiments of this invention, and methods of practicing the same, have been illustrated and described, it will be recognized that this invention may be otherwise variously embodied and practiced within the scope of the following claims.

What is claimed is:

1. In a device for cleaning a window surface wherein said device comprises a longitudinal axis and a pair of wiping members dispaced in spaced apart relation parallel to said axis, the improvement comprising a right circular cylindrical cleaning member dispaced between and fixed to said wiping members and having a polymeric core and a fabric-like material with fabric members disposed in a predetermined pattern and defining spaced openings therein, wherein said cleaning member comprises a substantially semicylindrical portion which is adapted to engage said window surface midway between said wiping members during cleaning movements of said device in either of apposed directions roughly perpendicular to its longitudinal axis, said semicylindrical portion being made of yieldable resilient material and providing a substantially rectangular cleaning surface upon being compressed against said window surface.

2. A device as set forth in claim 1 in which said rectangular cleaning surface has an area which is increased as a function of the pressure with which said cleaning member is urged against said window surface.

3. A device as set forth in claim 1 in which said wiping members and said cleaning member are each made primarily of polymeric material.

4. A device as set forth in claim 3 in which said polymeric material is rubber material.

5. A device as set forth in claim 1 in which the polymeric material of said core extends at least partially through said openings and serves as a matrix reinforcing said fabric members thereby maintaining said spaced openings with cleaning movements of said device.

6. A device as set forth in claim 1 in which said semicylindrical portion defines an outwardly facing portion of said right circular cylindrical member, and said fabric-like material defines said exposed surface of said semicylindrical portion and the entire exposed surface of said right circular cylindrical member.

7. A device as set forth in claim 6 in which said right circular cylindrical member comprises a central cylindrical core, said cylindrical core having said fabric-like material bonded thereagainst and concentrically therearound, and said polymeric core of said semicylindrical portion comprises a part of said cylindrical core.

8. A device as set forth in claim 7 in which said cylindrical core is made of a substantially solid yet compressible polymeric material.

9. A device as set forth in claim 7 in which said cylindrical core is made of a tubular polymeric material having a central bore extending centrally therethrough.

10. A device as set forth in claim 1 in which said wiping members comprise a single-piece structure of substantially U-shaped cross-sectional configuration and having said cleaning member bonded into position therebetween.

11. A device as set forth in claim 10 in which each of said wiping members has a substantially trapezoidal cross-sectional configuration comprised of a longer and a shorter parallel side, said longer side defining the base of its wiping member and said shorter side defining the wiping end portion of its wiping member.

12. A device as set forth in claim 11 in which the trapezoidal cross-sectional configuration of each of the wiping members is in the form of an isosceles trapezoid.

13. In a method of making a device for cleaning a window surface, said method comprising the steps of disposing a pair of wiping members in spaced apart relation parallel to a longitudinal axis of said device and fixing a cleaning member between and to said wiping members, the improvement comprising the steps of, constructing said cleaning member in a substantially right circular cylindrical configuration having a polymeric core and fixing a fabric-like material against said core to define the exposed surfaces of said cleaning member, said fabric-like material having fabric members disposed in a predetermined pattern and defining spaced openings therein, said cleaning member having a substantially semicylindrical portion of a yieldable resilient material, disposing said cleaning member to engage said window surface roughly midway between said wiping members during cleaning movements of said device in either of opposed directions roughly perpendicular to its longitudinal axis, and forming said semicylindrical portion of a yieldable resilient material which provides a substantially rectangular cleaning suface upon being compressed against said window surface.

14. A method as set forth in claim 13 in which said disposing step comprises the preparation step of making said wiping members as a single-piece roughly U-shaped structure and said bonding step comprises fixing said cleaning member between cooperating surfaces of said wiping members which face each other.

15. A method as set forth in claim 13 including the step of constructing said semicylindrical portion as an outwardly facing portion of said right circular cylindrical member, said fabric-lke material defining said exposed surface of said semicylindrical portion and the entire exposed surface of said right circular cylindrical member.

16. A method as set forth in claim 15 in which said step of constructing said cleaning member as a right circular cylindrical member comprises constructing a central cylindrical core for said cleaning member, said cylindrical core having said fabric-like material bonded thereagainst and concentrically therearound, and said polymeric core of said semicylindrical portion comprising a part of said cylindrical core.

* * * * *